United States Patent
Nieuwland et al.

(10) Patent No.: US 6,493,805 B2
(45) Date of Patent: *Dec. 10, 2002

(54) METHOD AND SYSTEM FOR SYNCHRONIZING BLOCK-ORGANIZED DATA TRANSFER AMONGST A PLURALITY OF PRODUCER AND CONSUMER STATIONS

(75) Inventors: André K. Nieuwland; Paul E. R. Lippens, both of Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,699

(22) Filed: Oct. 29, 1998

(65) Prior Publication Data

US 2002/0083276 A1 Jun. 27, 2002

(30) Foreign Application Priority Data

Oct. 29, 1997 (EP) .............................................. 97202568

(51) Int. Cl.⁷ .............................................. G06F 12/14
(52) U.S. Cl. ........................ 711/152; 709/102; 710/241
(58) Field of Search ................................. 375/356, 360; 709/104, 106, 212, 207, 232, 237, 304; 710/200; 711/163, 148; 713/400, 500

(56) References Cited

U.S. PATENT DOCUMENTS

| | | | | |
|---|---|---|---|---|
| 5,263,161 A | * | 11/1993 | Barth et al. | 711/152 |
| 5,313,638 A | * | 5/1994 | Ogle et al. | 710/200 |
| 5,432,911 A | * | 7/1995 | Mura et al. | 700/14 |
| 5,968,134 A | * | 10/1999 | Putzolu et al. | 709/302 |
| 6,185,287 B1 | * | 2/2001 | Miloslavsky | 379/219 |

* cited by examiner

Primary Examiner—Reginald G. Bragdon
(74) Attorney, Agent, or Firm—Gwenaelle Le Pennec

(57) ABSTRACT

With respect to a particular facility semaphore-based synchronizing is executed among a first station and one or more second stations. For each station a single bivalent semaphore is provided. The first station checks all second station semaphores as having a second state relative to its own semaphore's first state. It then executes a first accessing operation and flips the first state. Otherwise it foregoes the first accessing operation. Any second station checks the first station semaphore as having the second state relative to its own semaphore's second state. It then executes a second accessing operation an d flips the latter state. Otherwise it foregoes the second accessing operation.

5 Claims, 5 Drawing Sheets

```
            DISABLE (Communication_Interrupts);
              •
              •                                // PROGRAM CODE
              •
            READ (Local_Semaphore);
loop:
            CLEAR (Communication_Interrupts);  // CLEAR COMMUNICATION
                                               // COMMUNICATION INTERRUPTS
                                               // SHOULD REMAIN PENDING
                                               // UNTIL IDLE STATE READ (Remote_Semaphore);

IF    (Local_Semaphore < > Remote_Semaphore);
              JMP  not-idle                    // '<>' WILL BE '==' FOR
                                               // THE DATA PRODUCER ENABLE (Communication_Interrupts); // PENDING COMMUNICATION
                                               // INTERRUPTS SHOULD REMAIN
                                               // PENDING UNTIL THE IDLE
                                               // STATE IS REACHED IDLE;                              // THIS STATE WILL BE LEFT
                                               // ON A COMMUNICATION IRQ DISABLE (Communication_Interrupts);

JMP  loop;

not_idle:
              •
              •                                // PROGRAM CODE:
              •                                // READ AND PROCESS THE
                                               // DATA IN THE BLOCK
```

FIG. 5

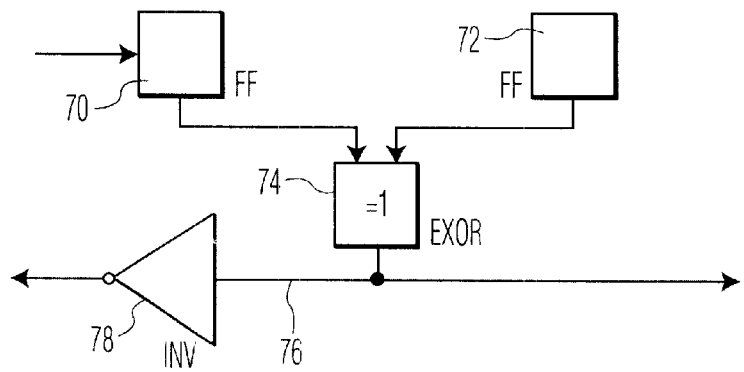

METHOD AND SYSTEM FOR SYNCHRONIZING BLOCK-ORGANIZED DATA TRANSFER AMONGST A PLURALITY OF PRODUCER AND CONSUMER STATIONS

BACKGROUND OF THE INVENTION

The invention relates to a synchronizing method. U.S. Pat. No. 4,594,657 describes a semaphore organization between first and second stations through a first binary semaphore that indicates ownership or non-ownership, and a second binary ownership semaphore that indicates which of the two stations previously owned the semaphore. First gating circuitry decodes control signals from the first station and generates a read or write signal. The read signal from the first gating circuit loads the semaphore and ownership signals into first and second flipflops respectively, whose outputs are applied to the data bus of the first station. Second gating circuitry decodes control signals from the second station and generates a read or write signal. The read pulse signal from the second gating circuitry loads the semaphore and ownership signals into third and fourth flipflops, respectively, whose outputs are applied to the data bus of the second station. If the first and second stations access the semaphore simultaneously, access is granted to the second station since the output of the third flipflop resets the first flipflop to deny access to the first station. Although the organization as described operates in a correct manner, the present inventors have experienced a need for a protocol that will flexibly extend to a larger number of stations which may access a single data facility, in particular, an amount of data in a memory, either as information consumers or as information producers.

SUMMARY TO THE INVENTION

In consequence, amongst other things, it is an object of the present invention to provide an organization and protocol that at a low hardware cost are more flexible and more symmetric, in particular by assigning each respective semaphore to exactly one single station, so that write conflicts between two or more stations with respect to a particular semaphore are categorily ruled out. The invention also relates to a data processing apparatus arranged for practising the synchronizing method.

Prior art has a hardware semaphore that signals the previous mode of the system, which is not straightforwardly extendable to more than two stations, and which is in particular suitable for sharing a hardware resource. The present invention in particular shares data, and for block-organized transfer must ensure that reading is not started before writing has ended. The first station should not be allowed to execute a write-access with new data before all second stations will have read-accessed the old data. Alternatively, the second stations should all have filled in their respective and privileged parts of a collective data item, before the first station should be allowed to read. The fact that all semaphores have a single fixed owner station renders the scheme extendable. The invention may also be used in cases where two or more stations should synchronize their read accesses to a particular block of information that has been provided by a single write station. Note that the size of the block is inconsequential, and may go down to only a single sample such as a digital autio sample. The invention does not need specific and complex hardware for avoiding all conflicts between the various accessing operations.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 5, an exemplary code for a consumer station;

FIG. 6, an elementary semaphore arrangement.

DETAILED DESCRIPTION OF PREFERRED EMBODIMENTS

Figure 1:
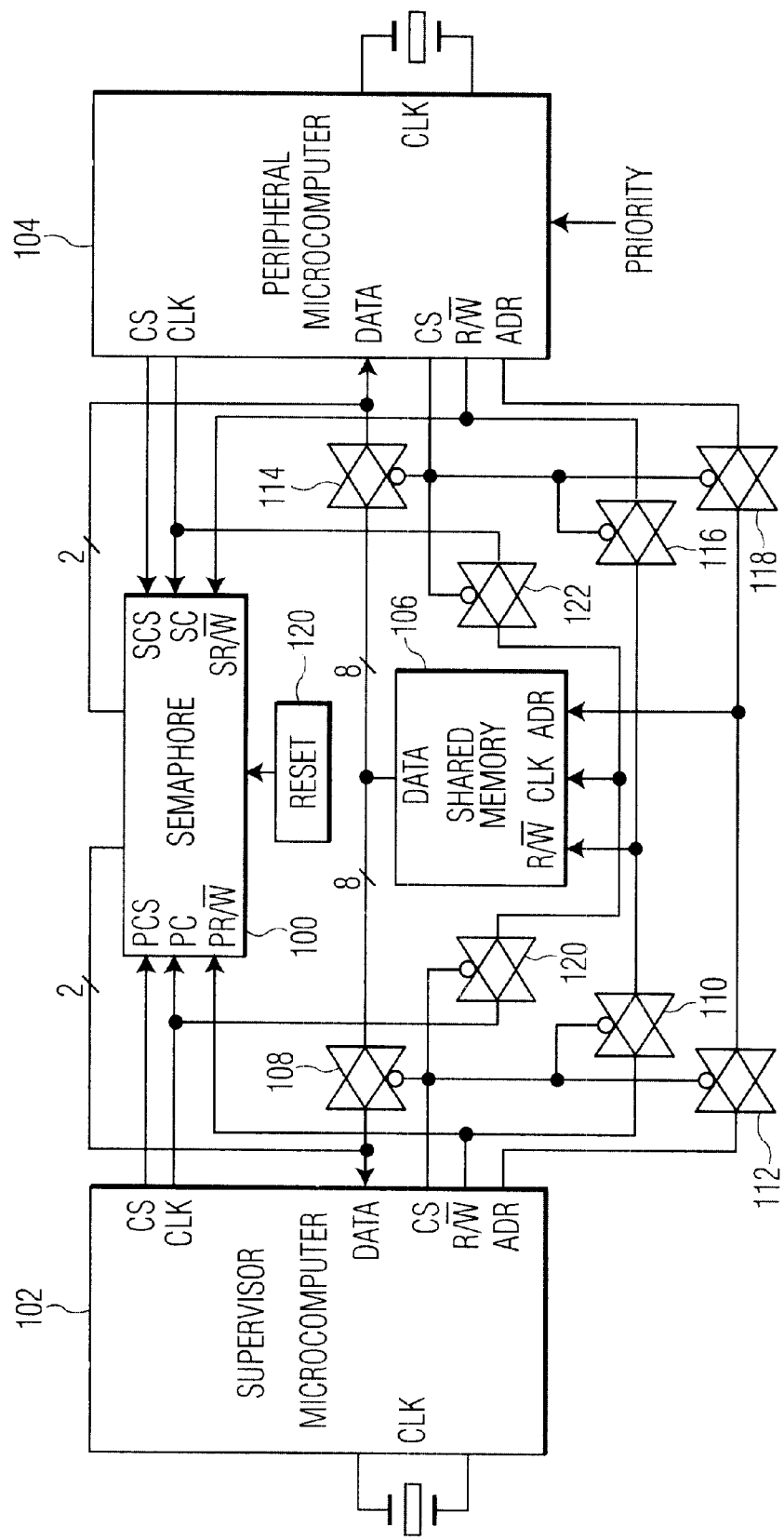
FIG. 1, a hardware embodiment of U.S. 4,594,657.

FIG. 1 is a hardware embodiment of U.S. 4,594,657 with semaphore 100. Stations 102, 104 share memory facility 106. The DATA, ADdRess, Read/Write and CLocK signals from superviser station 102 are applied to memory 106 through transmission gates 108, 110, 112 and 120, in response to control signal CS from station 102. Symmetrical signals are applied to memory 106 via switches 114, 116, 118 and 122 in response to control signal CS from peripheral station 104. If both stations would simultaneously access memory 106, semaphore 100 is used to determine which of the stations get preference. In this respect it is coupled to control signals SCS and PCS, clock signals SC and PC, and W/R signals from the two stations, for producing separate ownership signals for either of the stations. Before access, any station must read the state of the semaphore and ownership signals. The semaphore has a zero state to signal that the memory is presently not owned. The ownership signal has a binary one state to signal that station 102 previously owned the memory. If any of the stations reads semaphore 100 to find that the memory is not owned, it may access the memory. If the station is ready to give up ownership, it flips the semaphore signal to indicate that the memory is no longer owned. If both stations would access the memory simultaneously, semaphore 100 grants access to peripheral station 104.

Figure 2:
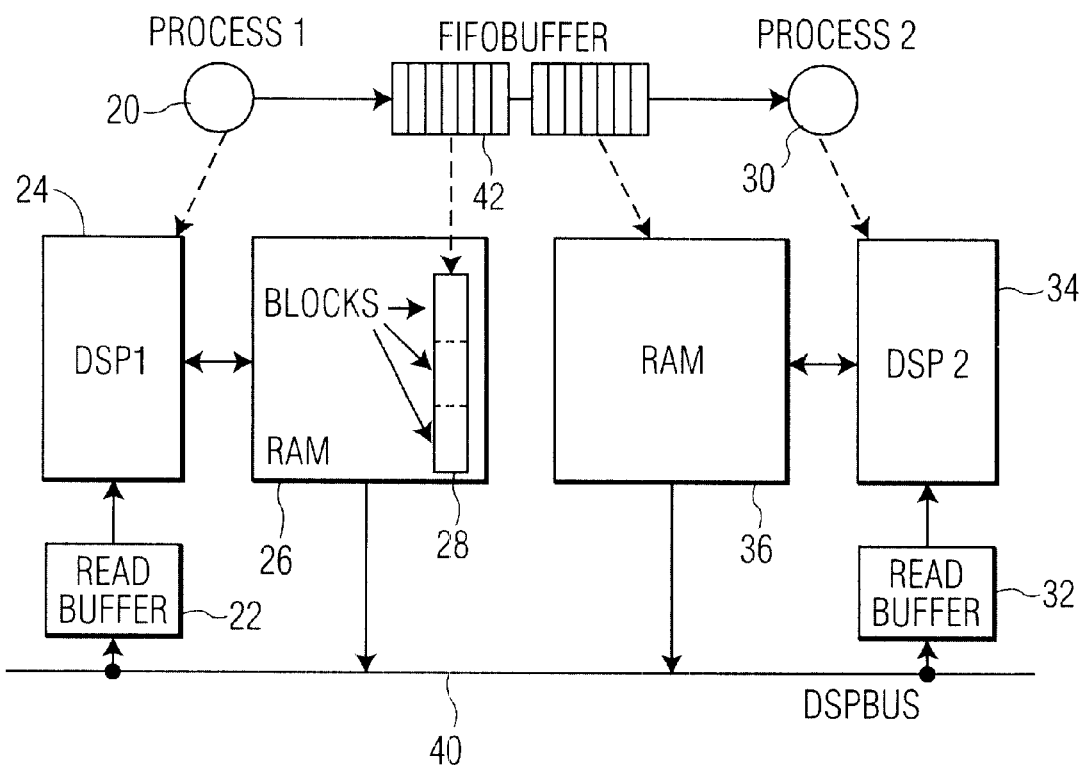
FIG. 2, the mapping of the Kahn model.

FIG. 2 shows the mapping of the Kahn model for use in two interconnected digital signal processors, for realizing the intercommunication at a low overhead tax. The model maps communication between processes 20, 30, with infinite FIFO buffering 42. If physical buffer space is limited, it is only necessary that the outputting process will block if the buffer is full and the inputting process will block if the buffer is empty. As shown, the FIFO buffer is distributed into blocks and mapped on the local memory 26, 28, 36, of one or both of the two stations. Coupling between the stations gets tighter if the FIFO is smaller, and/or the block size is larger.

Figure 3A:
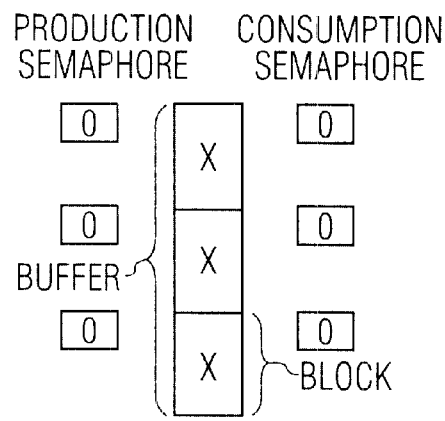
FIGS. 3A–C, a schematic of the twin-semaphore protocol.
Figure 3B:
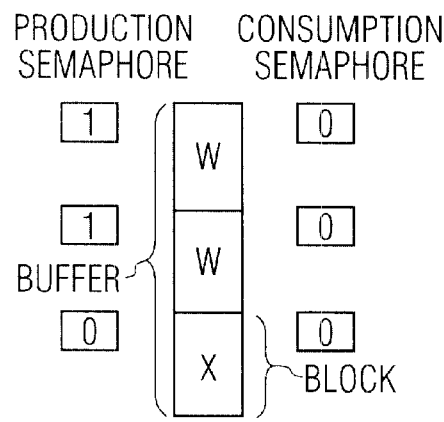
Figure 3C:
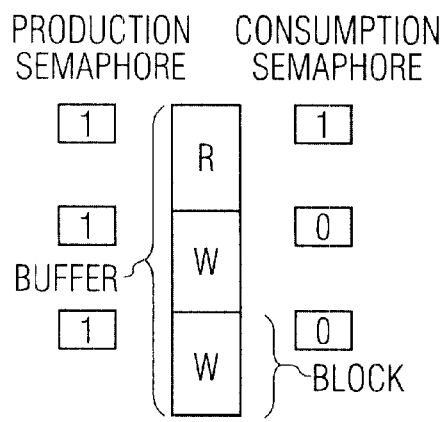

FIG. 3 shows a schematic of the twin-semaphore protocol. To prevent full blocks from being overwritten and empty blocks from being read, the two processors are synchronized by a simple flow control mechanism that has two semaphores for each buffer block. The use of two semaphores avoids shared-resource conflicts and the necessity for complex hardware solutions. The protocol is as follows. Initially, the block is empty and both semaphores are set to the same value, cf. FIG. 3A. The data producer must read the remote consumer semaphore and compare it with its own semaphore. If the two semaphores are equal, the producer is allowed to write data into the block that is being guarded by these particular semaphores. After writing the data, the producer toggles its own local semaphore. If the semaphores would have been unequal, the block contained unread data, and the producer has to wait in a blocked-write state as in FIG. 3B. Likewise, the data consumer compares its own semaphore with the remote producer semaphore whenever it desires to read data. The data guarded by the semaphores may be read whenever the semaphores are unequal. Otherwise the consumer has to wait in blocked-read state until new data becomes available. After the data has been read and the consumer station has toggled its semaphore, the data in the block may be overwritten again, cf. FIG. 3C. The twin-semaphore protocol uses the fact that buffer blocks are accessed in alternating fashion (producer-consumer-producer . . .). This avoids the necessity for hardware semaphores and/or spin-locks. Note that the set-up in FIGS. 3A–C applies to a series of three shared blocks, of which in FIG. 3B the third one is yet free.

Whenever a station has to wait for the availability of data or buffer space, respectively, it may poll the remote semaphore to see whether the status of the buffer has changed. To prevent the need for polling and the associated bus load and power waste, an interrupt is provided for the consuming (producing) station by the producing (consuming) station after it has changed its own semaphore. A similar procedure may apply if either the number of producers is plural or the number of consumers is plural, as has been hinted supra. Genetally, a station may go into low-power mode whenever it has to wait for completion of the accessing by the other station. Receiving an interrupt will wake the idle station and will cause it to re-evaluate the semaphore that had caused the idle state, cf. the diagram in FIG. 4.

Figure 4:
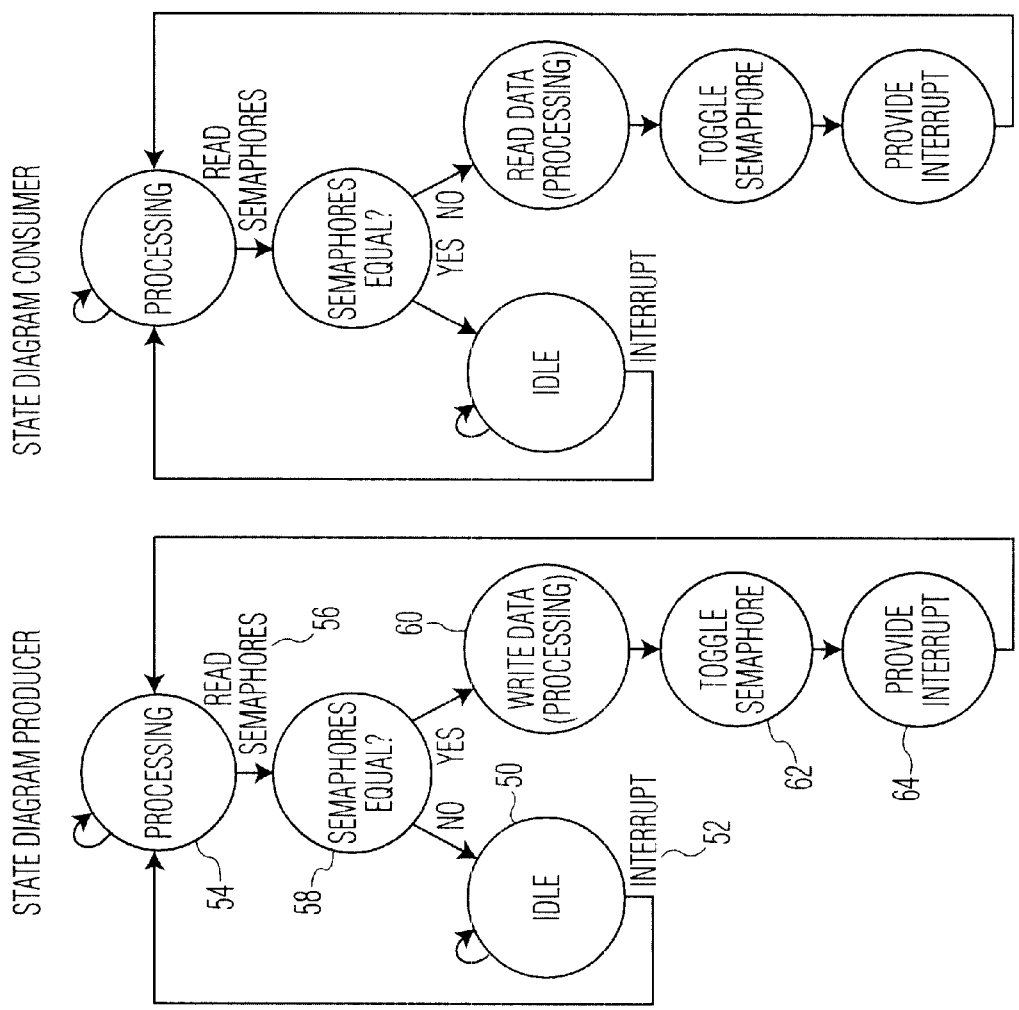
FIG. 4, a state diagram of two communicating stations.

FIG. 4 shows a state diagram of two communicating stations. To guarantee deadlock-free behaviour, the read-and-check of the remote semaphores, inclusive of the transition to the idle state, should resemble an atomic action. This relates to the embodiment with interrupts. That is, if a communication interrupt arrives after the remote semaphore has been read, it should remain pending until the idle state has been reached. It is important that the interrupt should arrive after the state of the semaphore had changed, but not earlier. The transmitting may therefore be effected, provided that it can be guaranteed that the interrupt will not arrive before the not yet changed semaphore may have been read. These communication interrupts carry no information and their only purpose is to wake up the communicating station in question from the idle state. If does not matter if they are overwritten by other communication interrupts. Therefore, these interrupts may be safely ignored while the station in question is still processing. From an Idle state (50) the station is awoken by an interrupt (52) to start operating (54). Next, the semaphores will be read (56), and their equality is checked. If no, the system may go back to Idle (50). If yes, the processing may execute a data write (60) operation. If completed, the associated semaphore is toggled (62). Finally, an interrupt is provided (64) and the station resumes processing (54). The other station operates in a likewise manner. Semaphores equal may be changed into unequal, if there are only two semaphores with respect to the associated block: this only implies a different logic function. If with respect to a particular block there are a plurality of consumer semaphores, all of these should preferably have the same state to signal that the reading had been completed, and further writing is being allowed.

FIG. 5 is a self-explanatory code example for a reading station. Again, the other station's code is nearly identical.

FIG. 6 is an elementary semaphore arrangement for two stations. At left is the first station that may toggle flipflop 70. At right is the second station that may toggle flipflop 72. If they are unequal as checked in EXOR 74, the right hand side station gets a logic "1". If they are equal, the left hand station gets a logic "1" through inverter 78. For simplicity, the generating of the interrupt has been ignored.

We claim:

1. A method for control of sharing a facility between multiple stations, wherein respective semaphores are associated with each respective one of the multiple stations;

each of the respective semaphores can assume one of two states;

allowing a particular one of the stations to execute a first operation on the facitlity and allowing the state of the semaphore of the particular station to be flipped if each respective semaphore of each other station has assumed a state opposite to the state of the semaphore of the particular station, and having the particular station forego the first operation otherwise, and allowing another one of the stations to execute a second operations on the facility and allowing the state of the semaphore of the another station to be flipped if the semaphore of the particular station and the semaphore of the another station have assumed a same state, and having the another station forego the second operation otherwise.

2. The method of claim 1 for synchronizing block organized data transfer, wherein the facility comprises at least a portion of a memory, and wherein the first operation comprises reading to the portion and the second operation comprises writing from the portion.

3. A method of claim 1, wherein the facility comprises at least a portion of a memory, and wherein the first operation comprises reading to the portion and the second operation comprises writing from the portion.

4. A data processing system comprising multiple sections, a facility shared by the multiple stations, an a controller for control of sharing the facility between the stations, wherein respective semaphores are associated with each respective one of the multiple stations;

each of the respective semaphores can assume one of two states;

the controller allows a particular one of the stations to execute a first operation on the facility and allowing the state of the semaphore of the particular station to be flipped, if each respective semaphore of each other station has assumed a state opposite to the state of the semaphore of the particular station, and having the particular station forego the first operation otherwise; and the controller allowing another one of the stations to execute a second operation on the facility and allowing the state of the semaphore of the another station to be flipped, if the semaphore of the particular station and the semaphore of the another station have assumed a same state, and having the another station forego the second operation otherwise.

5. An electronic circuit comprising a controller for control of sharing a facility between multiple stations, wherein respective semaphores are associated with each respective one of the multiple stations;

each of the respective semaphores can assume one of two states;

the controller allows a particular one of the stations to execute a first operation on the facility and allowing the state of the semaphore of the particular station to be flipped, if each respective semaphore of each other station has assumed a state opposite to the state of the semaphore of the particular station, and having the particular station forego the first operation otherwise; and the controller allowing another one of the stations to execute a second operation on the facility and allowing the state of the semaphore of the another station to be flipped, if the semaphore of the particular station and the semaphore of the another station have assumed a same state, and having the another station forego the second operation otherwise.

* * * * *